Sept. 27, 1949. W. D. VAN ZELM ET AL 2,483,027
HIGH-SPEED, JET-PROPELLED BOMBER AIRPLANE
Filed May 7, 1948 4 Sheets-Sheet 1
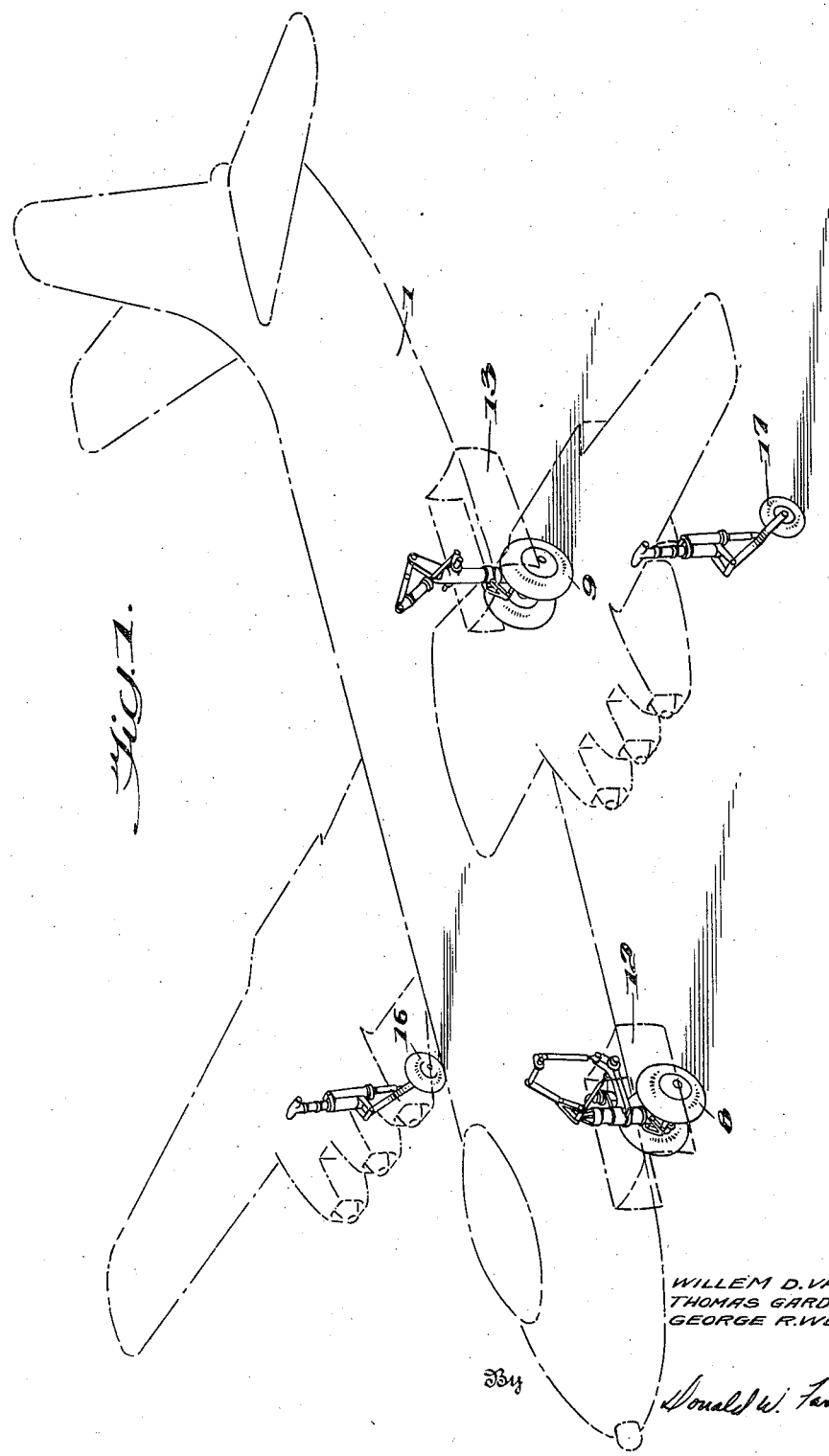
Inventors
WILLEM D. VAN ZELM,
THOMAS GARDNER HILL,
GEORGE R. WELDEN,
By
Donald W. Farrington
Attorney Sept. 27, 1949.    W. D. VAN ZELM ET AL    2,483,027
HIGH-SPEED, JET-PROPELLED BOMBER AIRPLANE
Filed May 7, 1948    4 Sheets-Sheet 2
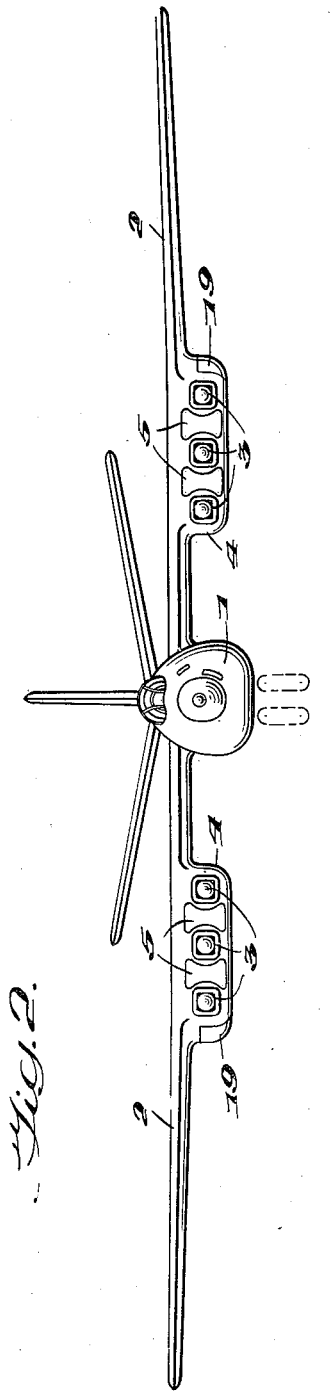
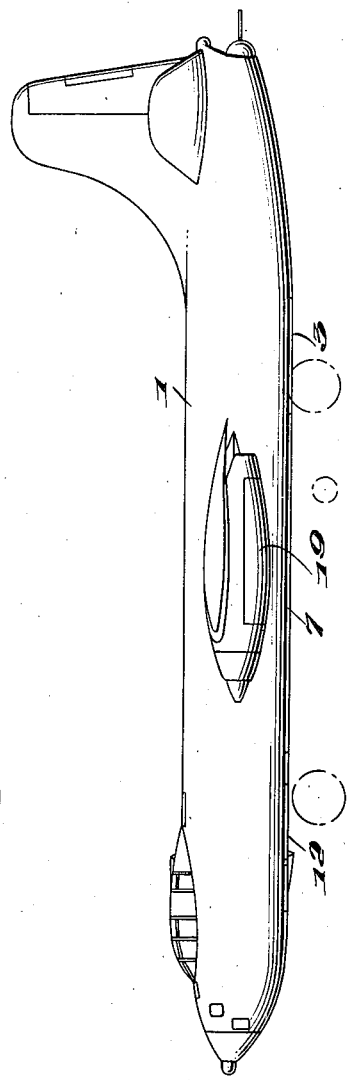
Inventors
WILLEM D. VAN ZELM,
THOMAS GARDNER HILL,
GEORGE R. WELDEN,
By Donald W. Farrington
Attorney Sept. 27, 1949. W. D. VAN ZELM ET AL 2,483,027
HIGH-SPEED, JET-PROPELLED BOMBER AIRPLANE
Filed May 7, 1948 4 Sheets-Sheet 3
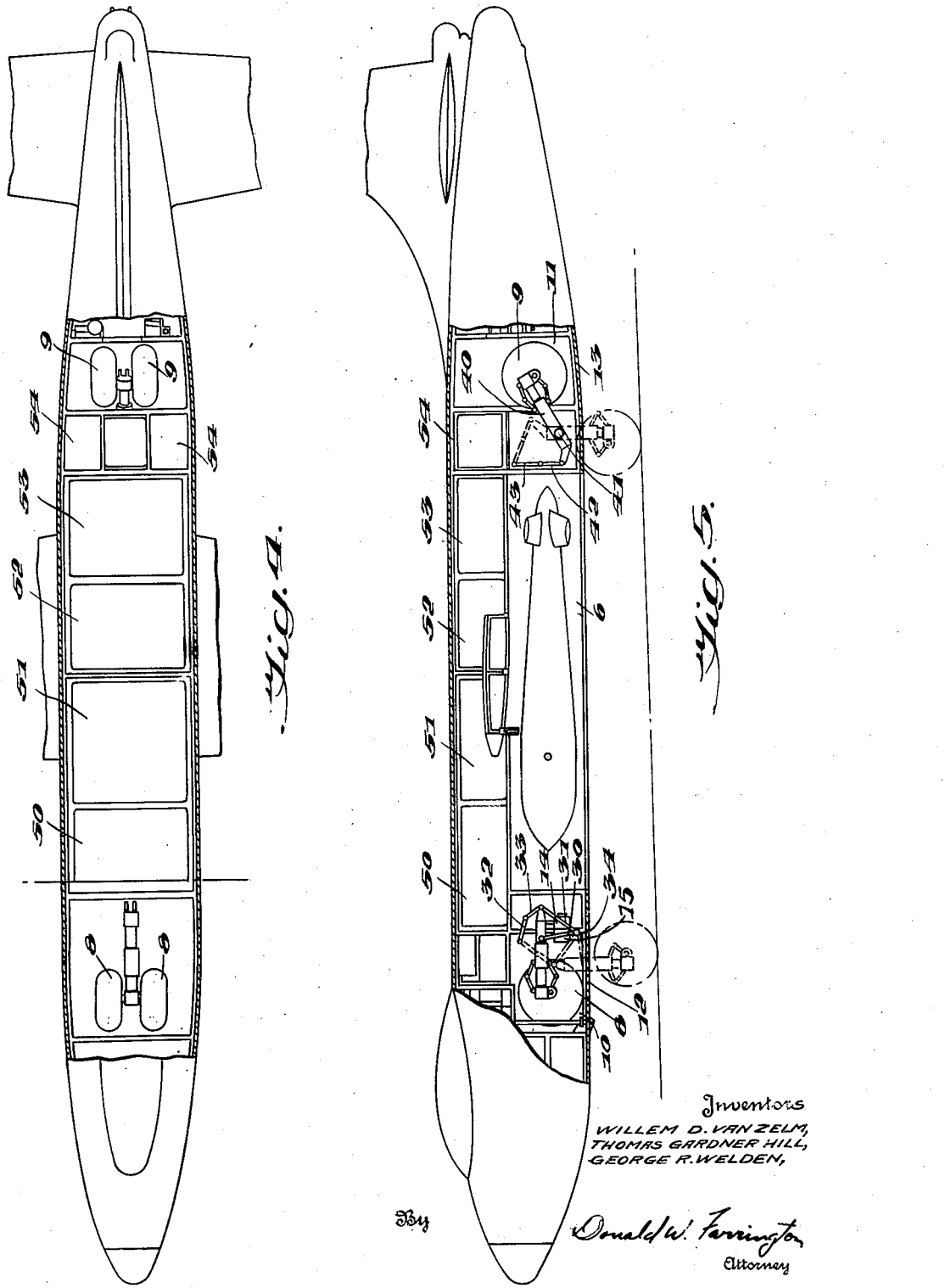

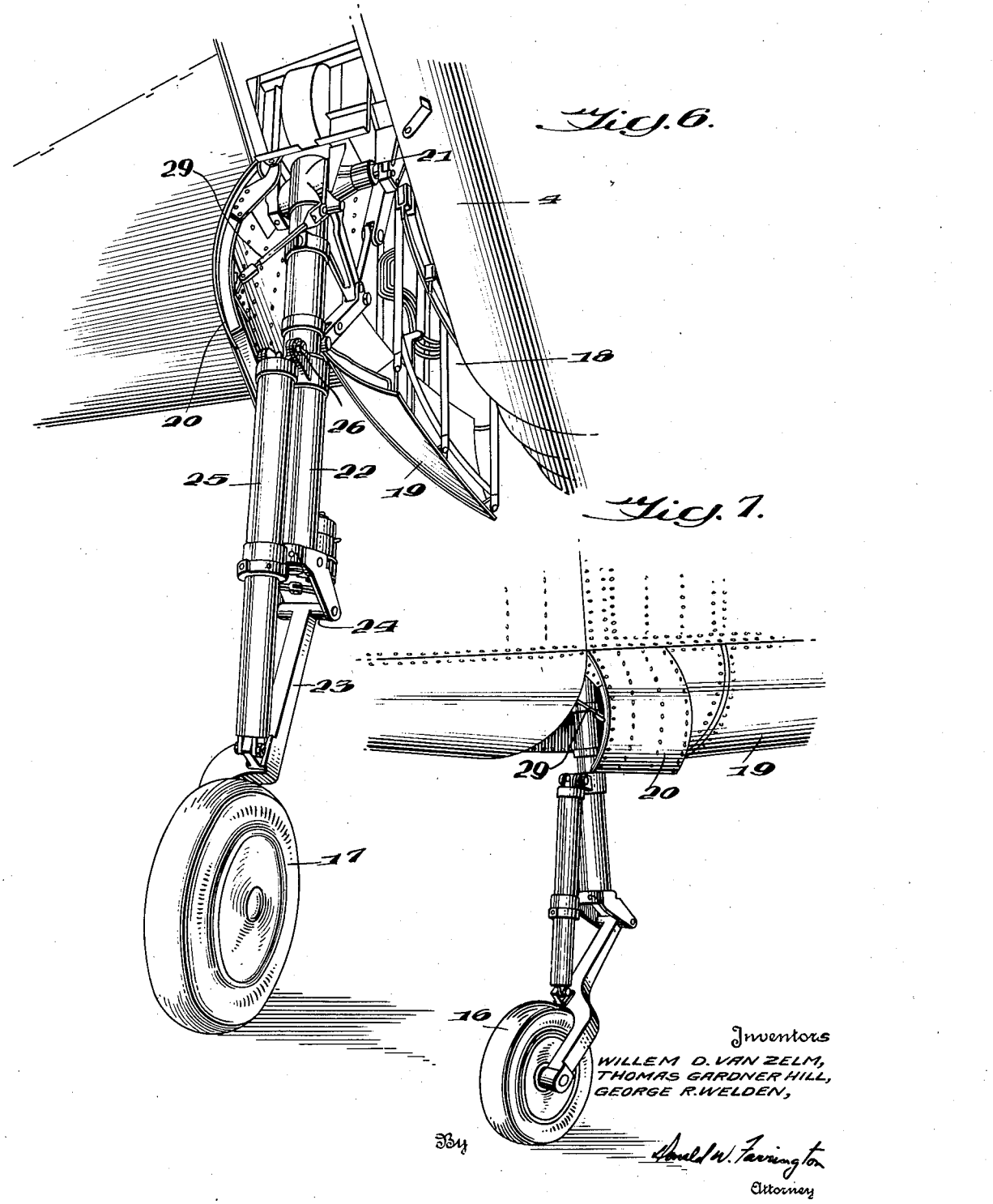

Patented Sept. 27, 1949

2,483,027

UNITED STATES PATENT OFFICE 2,483,027

HIGH-SPEED, JET-PROPELLED BOMBER AIRPLANE

Willem D. van Zelm, Ruxton, Thomas Gardner Hill, Severna Park, and George R. Welden, Baltimore, Md., assignors to The Glenn L. Martin Company, Middle River, Md., a corporation of Maryland Application May 7, 1948, Serial No. 25,586

10 Claims. (Cl. 244—102)

This invention relates to a new and improved very high-speed bomber, and more particularly to the structural features of the airplane which cooperate to attain the desired objectives of high speed with long range at high altitudes.

A thin, laminar flow high-speed airfoil is employed to attain the objective of high speed. The power plant found most adaptable for high-speed aircraft propulsion consists of groups of multiple jet units depending from the undersides of the wings. The high-speed, thin wing does not permit the stowage of main landing gear within its profile. The power plant, consisting of jet units, eliminates the conventional stowage place for the landing gear behind the conventional engine nacelle. The main landing gear is, therefore, arranged in tandem forward and aft the bomb bay. Since the bomb bay is so designed that the bomb load will be generally symmetrically distributed along the fuselage about the center of gravity of the airplane, the location of the main landing gear and the landing gear stowage compartments fore and aft the bomb bay make a symmetrical arrangement from the distribution of weight point of view. Lateral stability on the ground is achieved by auxiliary, full swiveling or castering gear depending from the wings on the outboard side of the jet engine nacelle. The auxiliary gear, since its only function is lateral stability, the primary load being borne on the main landing gear, may be of small dimensions and can be stowed in small stowage compartments on the outboard side of the engine nacelle and faired into the engine nacelle for minimum drag.

It is an object of this invention to provide a high-speed bomber airplane that can take advantage of the aerodynamic efficiency for speed, of the thin wings, and the high propulsion efficiency of the jet propulsion units.

It is another object of this invention to minimize drag in a high-speed airplane by locating the main landing gear in the fuselage.

It is another object of this invention to provide stowage compartments for the main landing gear in the fuselage.

It is another object of this invention to provide tandem landing gear for an airplane with swiveling or castering auxiliary gear mounted laterally thereof for lateral stability.

It is another object of this invention to provide a high-speed bombardment airplane having a tandem arrangement of main landing gear along the fuselage with swiveling auxiliary gear for lateral stability.

Further and other objects will become apparent from the description of the accompanying drawings which form a part of this disclosure and in which like numerals refer to like parts.

In the drawings:

Figure 1 is a phantom outline of the novel airplane arrangement showing the tandem arrangement of the main landing gear and the full swiveling lateral balancing auxiliary or tip gear.

Figure 2 is a front elevation of the airplane showing the general arrangement of power plant and landing gear.

Figure 3 is a side elevation of the same.

Figure 4 is a fragmentary plan view of the airplane partially in section showing the location of the landing gear and fuel storage cells within the fuselage.

Figure 5 is a side elevational view of the airplane partially in section showing the location of the landing gear stowage compartments and bomb bay.

Figure 6 is a perspective view from underneath the airplane wing looking forward, showing the auxiliary gear for lateral stability and the landing gear stowage compartment extending along the engine nacelle.

Figure 7 is another view of the gear opposite that shown in Figure 6 showing the gear in the operative position with the stowage compartment doors closed.

The airplane generally shown in Figures 1 to 3 has an elongated fuselage 1 from which extend thin, high-speed laminar flow wings 2. The power plant of this airplane consists of a plurality of jet engines 3 which are arranged on the underside of the wing depending from the spars in the wing. The engine nacelle, generally shown as 4, surrounds and encloses the jet engines 3. Engines 3 are so spaced along the underside of the wings as to provide tunnels or ducts 5 between adjacent engines to minimize drag. The engine nacelles and engines are located entirely below the upper surface of the wing. The portions of the nacelle extending forward and aft of the wing conform to the aerodynamic contour of the wing so that the high-speed characteristics of the wing are unimpaired by the engine nacelle. At the high speeds for which the airplane is designed, divergence of air flow from essentially straight paths is very costly in drag. Such divergence is reduced in this design by separating the jet engines and permitting the air to flow through intermediate ducts or passages, rather than to spill over the nacelle in bulk. By this means, the effective thickness ratios of the airfoil sections in the nacelle regions are maintained at a very low percent compared to what such an effective thickness ratio would be if the plurality of jet propulsion units were grouped on the underside of the wing without passages 5.

The bomb load of the airplane is carried in an elongated, horizontal bomb bay 6. The horizontal bomb bay offers a maximum diversity of loading with a minimum of loading time. The bomb bay is arranged so that it can support many small bombs or a single large bomb, as shown. The bomb bay is arranged to extend fore and aft of the wing and center of gravity of the airplane for proper balance in flight. Quick acting bomb bay doors 7 retract within the fuselage contour to minimize drag during a bomb run. The main landing gear 8 and 9 are located fore and aft of the bomb bay in landing gear stowage compartments 10 and 11. The location of the stowage compartments and thereby the gear, with respect to the bomb bay, maintains the balance of the airplane. The landing gear stowage compartments have doors 12 and 13, which are closed when the landing gears are in the retracted position. Since main landing gear 8 and 9 are in tandem, one of the gears must be steerable for taxiing the airplane. Steering cylinders 14 and 15 are provided to rotate landing gear 8 through about 55° of steering angle. Steering cylinders 14 and 15 may be either single acting hydraulic cylinders or double acting cylinders depending upon the torque requirements to turn the gear. Each cylinder is provided with a restrictor check valve, that is, a check valve having a restrictor orifice therein to provide shimmy dampening in the steering cylinder.

The auxiliary gear 16 and 17, arranged for lateral stability, depend from the wings and are secured at the outboard side of the engine nacelle. A compartment 18 extends longitudinally of the engine nacelle 4 to accommodate the auxiliary gear. The nacelle is provided with a large door 19 and small door 20 which close compartment 18 and form a faired, streamline exterior when the gear is in the retracted position. This auxiliary gear is provided with a trunnion 21 from which depends oleo strut 22. The landing-gear-wheel-supporting-bracket 23 is secured to a trunnion 24 and is inclined to the rear so the wheel assumes a trailing attitude upon forward motion of the airplane. Shock absorbing strut 25 is pivotally mounted on an oleo strut 22 at 26 so that auxiliary gear 16 and 17 may bear some of the load and provide lateral stability for the airplane upon landing, taxiing, or take-off, and at the same time be permitted to have full swiveling or castering upon landing in gusts, or taxiing, as the main landing gear is steered.

The landing gear door 20 is arranged with a suitable linkage 29 to open with the extension of gear 16 or 17 and to then close when the gear is retracted.

Landing gear 8 is supported by a linkage consisting of members 30, 31, 32 and 33. Linkages 30 and 31 support the main oleo strut and pivot about point 34 in the retracted position shown in the full lines in Figure 5. Linkages 32 and 33 assume an aligned position to lock the gear in the retracted position. Linkages 32 and 33 are jack-knifed during the extension of gear 8, until they again assume the aligned position shown in the dotted-line-extended-position of gear 8 shown in Figure 5, where again the linkages are locked to maintain the gear in the operative position. Rear main landing gear 9 has its oleo strut 40 pivoted at 41. Linkages 42 and 43 are aligned in the retracted and extended positions to lock the gear in these positions.

The thin, high-speed wings, having so much of their extent occupied by engines, precludes the conventional storage of fuel in the wings except in a very small space in the root section. The horizontal bomb bay, however, while being more efficient from a bomb loading point of view, also affords adequate fuel storage space in the upper portion of the fuselage over the bomb bay and landing gear stowage compartments. Since the bomb bay and landing gear stowage compartments are symmetrically positioned with respect to the center of gravity of the airplane, the fuel tanks are so arranged that the fuel loading is in an optimum location from a weight and balance point of view. Flexible fuel storage cells 50 to 54 are arranged in this space over the bomb bay and main landing gear stowage compartments in the upper portion of the fuselage. These flexible fuel storage cells may be either of the bullet-sealing or non-bullet-sealing cell wall construction and can be tailored to fit the compartment space thereby affording a maximum storage capacity for the airplane.

From the foregoing description of the drawings showing the preferred embodiment of the invention, it can be seen that a high-speed, jet-propelled airplane, having the desired high-speed characteristics, adequate bomb-carrying bomb bay and fuel supply for long range, can be provided by taking advantage of the high-speed, thin wing and jet propulsion units for speed, the drag being reduced to a minimum by having the main landing gear in the fuselage with lateral balancing gear in the engine nacelles.

It is to be understood that certain changes, alterations, modifications and substitutions can be made without departing from the spirit and scope of the appended claims.

We claim as our invention:

1. An airplane having a fuselage, high-speed laminar flow wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one in each of said compartments substantially equi-distant fore and aft of the center of gravity to support the fuselage when on the ground.

2. An airplane having a fuselage, high speed, thin wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one in each of said compartments substantially equi-distant fore and aft of the center of gravity to support the fuselage when on the ground, and balancing gear secured to said wing, outboard of said engine nacelles.

3. An airplane having a fuselage, high speed laminar flow wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one landing gear in each of said compartments substantially equi-distant fore and aft of the center of gravity to support the fuselage when on the ground, and castering balancing gear secured to said wing, outboard of said engine nacelles.

4. An airplane having a fuselage, high-speed, thin wings extending from said fuselage, a plurality of jet propulsion units mounted in nacelles depending from said wings, main landing gear stowage compartments spaced along said fuselage arranged in the underside thereof, main landing gear arranged in tandem, one landing gear in each of said compartments substantially equi-distant fore and aft of the center of gravity to support the airplane when on the ground, a longitudinally-extending, transverse partition dividing the fuselage between said landing gear stowage compartments into upper and lower sections, said upper section providing fuel storage space and said lower section providing load-carrying space, each section being located substantially symmetrically about the center of gravity of the airplane.

5. An airplane having a fuselage, high-speed laminar flow wings extending from said fuselage, a plurality of jet propulsion units mounted in nacelles depending from said wings, main landing gear stowage compartments spaced along said fuselage arranged in the underside thereof, main landing gear arranged in tandem, one landing gear in each of said compartments substantially equi-distant fore and aft of the center of gravity to support the airplane when on the ground, a longitudinally-extending, transverse partition dividing the fuselage between said landing gear stowage compartments into upper and lower sections, said upper section providing fuel storage space and said lower section providing load-carrying space, each section being located substantially symmetrically about the center of gravity of the airplane, and full swiveling balancing gear positioned laterally of said fuselage depending from said wings.

6. An airplane having a fuselage, high-speed laminar flow wings extending from said fuselage, a plurality of jet propulsion units mounted in nacelles depending from said wings, main landing gear stowage compartments spaced along said fuselage arranged in the underside thereof, main landing gear arranged in tandem, one in each of said compartments substantially equi-distant fore and aft of the center of gravity to support the airplane when on the ground, a longitudinally-extending, transverse partition dividing the fuselage between said landing gear stowage compartments into upper and lower sections, said upper section providing fuel storage space and said lower section providing load-carrying space, each section being located substantially symmetrically about the center of gravity of the airplane, and full swiveling balancing gear positioned laterally of said fuselage depending from said nacelles, a longitudinally-extending stowage compartment for said balancing gear formed in said nacelles, and means to extend and retract said balancing gear to and from the operative position.

7. An airplane having a fuselage, high-speed, thin wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one in each of said compartments substantially equi-distant fore and aft of the center of gravity to support the fuselage when on the ground, and steering means mounted on one of said main landing gear for maneuvering said airplane on the ground.

8. An airplane having a fuselage, high-speed, thin wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one in each of said compartments substantially equi-distant fore and aft of the center of gravity to support the fuselage when on the ground, balancing gear secured to said wing outboard of said engine nacelles, and hydraulic cylinder means associated with said main landing gear for steering said gear.

9. An airplane having a fuselage, high-speed, thin wings extending from said fuselage, a plurality of jet propulsion units mounted in nacelles depending from said wings, a bomb bay extending along the underside of the fuselage substantially symmetrically arranged with respect to the center of gravity of the airplane, main landing gear stowage compartments arranged in the underside of the fuselage fore and aft of the bomb bay, main landing gear arranged in tandem, one in each of said compartments substantially equi-distant fore and aft of the center of gravity to support the fuselage when on the ground, fluid cylinder means associated with said main landing gear for steering, and castering balancing gear secured to said wing outboard of said engine nacelles.

10. An airplane having a fuselage, high-speed laminar flow wings extending from said fuselage, a plurality of jet propulsion units mounted in nacelles depending from said wings, main landing gear stowage compartments spaced along said fuselage arranged in the underside thereof, main landing gear arranged in tandem, one in each of said compartments substantially equidistant fore and aft of the center of gravity to support the airplane when on the ground, a longitudinally-extending load-carrying space between said landing gear stowage compartments located substantially symmetrically about the center of gravity of the airplane, and full swiveling balancing gear positioned laterally of said fuselage depending from said nacelles, a longitudinally-extending stowage compartment for said balancing gear formed in said nacelles, and means to extend and retract said balancing gear to and from the operative position.

WILLEM D. van ZELM.
THOMAS GARDNER HILL.
GEORGE R. WELDEN.

REFERENCES CITED

The following references are of record in the file of this patent:

UNITED STATES PATENTS

| Number | Name | Date |
| --- | --- | --- |
| 1,855,861 | Manor | Apr. 26, 1932 |
| 2,110,865 | Burgess | Mar. 15, 1938 |
| 2,329,168 | Wassall | Sept. 7, 1943 |

FOREIGN PATENTS

| Number | Country | Date |
| --- | --- | --- |
| 383,375 | France | Jan. 7, 1908 |
| 510,164 | Great Britain | July 27, 1939 |